(12) United States Patent
Jun

(10) Patent No.: US 7,818,983 B2
(45) Date of Patent: Oct. 26, 2010

(54) DRIVING DEVICE OF A WASHING MACHINE AND A METHOD OF DRIVING A WASHING MACHINE WITH THE SAME

(75) Inventor: Cha Seung Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 966 days.

(21) Appl. No.: 11/600,113

(22) Filed: Nov. 16, 2006

(65) Prior Publication Data
US 2007/0107474 A1  May 17, 2007

(30) Foreign Application Priority Data
Nov. 17, 2005 (KR) .................... 10-2005-0110320

(51) Int. Cl.
*D06F 33/02* (2006.01)
(52) U.S. Cl. ....................... 68/12.23; 68/140
(58) Field of Classification Search ................ 68/12.23, 68/140
See application file for complete search history.

(56) References Cited

U.S. PATENT DOCUMENTS

| | | | | |
|---|---|---|---|---|
| 4,446,706 A | * | 5/1984 | Hartwig | ............... 68/24 |
| 4,879,502 A | * | 11/1989 | Endo et al. | ............... 318/723 |
| 5,068,777 A | * | 11/1991 | Ito | ............... 363/97 |
| 5,091,841 A | | 2/1992 | Tuusa | |
| 5,813,069 A | | 9/1998 | Kim | |
| 6,324,085 B2 | * | 11/2001 | Kimura et al. | ............... 363/132 |
| 6,445,879 B1 | | 9/2002 | Youn et al. | |
| 6,490,752 B2 | * | 12/2002 | Kushida et al. | ............... 15/319 |
| 6,512,341 B2 | * | 1/2003 | Matsushiro et al. | .... 318/400.07 |
| 6,534,948 B2 | * | 3/2003 | Ohura et al. | ............... 318/798 |
| 6,539,753 B1 | * | 4/2003 | Ito et al. | ............... 68/3 R |
| 6,617,821 B2 | * | 9/2003 | Kerkman et al. | ............... 318/801 |
| 6,690,593 B2 | * | 2/2004 | Kimura et al. | ............... 363/98 |
| 6,828,752 B2 | * | 12/2004 | Nakatsugawa et al. | ...... 318/801 |
| 6,850,031 B2 | * | 2/2005 | Nakata et al. | ............... 318/801 |
| 7,017,377 B2 | * | 3/2006 | Hosoito et al. | ............... 68/12.16 |
| 7,064,517 B2 | * | 6/2006 | Kiuchi et al. | ............... 318/802 |
| 7,141,943 B2 | * | 11/2006 | Song et al. | ............... 318/400.34 |
| 7,176,645 B2 | * | 2/2007 | Shimada et al. | ............... 318/432 |
| 7,579,798 B2 | * | 8/2009 | Hosoito et al. | ......... 318/400.02 |
| 2003/0020431 A1 | | 1/2003 | Kiuchi et al. | |

FOREIGN PATENT DOCUMENTS

| | | | |
|---|---|---|---|
| JP | 2001-211679 | * | 8/2001 |
| JP | 2002-153082 | * | 5/2002 |
| KR | 2001066586 | * | 7/2001 |

* cited by examiner

*Primary Examiner*—Frankie L Stinson
(74) *Attorney, Agent, or Firm*—McKenna Long & Aldridge LLP

(57) ABSTRACT

A driving device and a method of driving a washing machine is disclosed. The efficiency of the motor of the washing machine is enhanced and the capacity of an inverter is reduced thereby reducing manufacturing costs. The driving device includes a variable motor, of which the rotational speed varies to apply a driving force to a drum to rotate, an inverter to convert a direct current voltage into an alternating current voltage and to vary a voltage applied to the variable motor, and an inverter driver to compare a control signal with a carrier to drive the inverter by pulse width modulation. A frequency of the carrier wave is varied for the pulse width modulation.

13 Claims, 4 Drawing Sheets a driving device and a method of driving a washing machine. More particularly, the present invention relates to a driving device and a method of driving a washing machine which enhances the efficiency of an inverter and increases the capacity of the inverter by providing a steady flow of current to the motor to improve the energy loss of the motor and reduce manufacturing costs.

2. Discussion of the Related Art

In general, a pulsator type washing machine is an apparatus which removes various contaminants attached to laundry using an emulsification of detergent, frictional force of water flow due to the rotation of pulsator blades, and agitation applied to laundry by the pulsator. In the pulsator type washing machine, a quantity and type of laundry are detected by a sensor. A washing cycle is automatically determined by a microcomputer in the washing machine based on the quantity and type of laundry. Washing water is supplied to a proper level based on the quantity and the type of laundry, and the washing cycle is performed under the control of the microcomputer.

A drum type washing machine is an apparatus for washing laundry using frictional force between the laundry and a drum rotated by the driving force of a motor where the laundry, water, and detergent are present within the drum. In the drum type washing machine, the drum is rotated and the contaminants are removed due to the beating and rubbing of the laundry inside the drum. Damage and entanglement of the laundry is minimized in a drum type washing machine.

Related Art drum type washing machines utilize one of two different driving methods: an indirect drive method and a direct drive method. In an indirect drive method, the driving force of the motor is indirectly transmitted to the drum via a motor pulley and a belt wound around the drum pulley. There is significant energy loss and noise produced during the transmission of the driving force in an indirect drive method.

In order to solve the problems of the indirect drive method, it has been a growing trend for the related art drum type washing machines to employ a direct drive method for driving the drum. The rotor of the motor is directly connected to the rear wall of the tub in a direct drive method, such that the driving force of the motor is directly transmitted to the drum.

The structure of the related art direct drive drum type clothes washing machine will be briefly described with reference to FIG. 1.

FIG. 1 is a vertical sectional view illustrating the structure of a related art direct drive drum type washing machine. The related art direct drive drum type washing machine includes a tub 2 installed in a cabinet 1, a drum 3 installed in the tub 2, a shaft 4 coupled with the drum 3 to transmit the driving force of a motor 5 to the drum 3, and bearings—(not shown) installed around the ends of the shaft 4.

A door 21 is installed to a front side of the cabinet 1 and a gasket 22 is installed between the door 21 and the tub 2.

A hanging spring 23 is installed between the upper side of the cabinet 1 and the upper outer circumference of the tub 2 to support the tub 2, and a friction damper 24 is installed between the lower side of the cabinet 1 and the lower outer circumference of the tub 2 to dampen vibration of the tub 2 generated during the spin mode.

The motor 5 includes a stator 7 coupled with a rear wall 200 of the tub 2 and a rotor 6 to surround the stator 7. The driving force of the motor is directly transmitted to the drum 3 via the shaft 4. In other words, an additional pulley and belt are not needed to transmit the driving force, because the drum 3 is directly driven.

The motor 5 employed in a washing machine is typically a variable speed motor in which the rotation speed and/or the rotation direction can be controlled. Recently, a permanent magnet type motor, particularly a brushless DC (BLDC) motor has been widely used.

The BLDC motor includes a rotor which forms a field and transmits a torque to the stator of the motor. A stator coil is wound around the stator such that a rotational magnetic field is generated due to interaction with the field from the rotor to generate a torque, whereby a magnetic circuit is formed. A position detector to detect a rotation position of the rotor may also be included in the BLDC motor.

The motor of the washing machine is driven by the microcomputer which controls the motor according to predetermined washing cycles, such as a washing mode, a spin mode, and a rinsing mode. The control of the motor includes control of the rotation speed, torque, and rotational direction of the motor.

Hereinafter, a driving device and a driving method of the related art drum type washing machine will be described with reference to FIG. 2. FIG. 2 is a circuit block diagram illustrating a driving device of a conventional drum type washing machine that includes a conventional BLDC motor.

As illustrated in FIG. 2, the driving device of the related art drum type clothes washing machine includes a rectifier 11, a capacitor 12, an inverter 13, a rotor position detecting circuit 15, a microcomputer 16, and an inverter driving unit 17.

The rectifier 11 receives and rectifies a single phase alternating current voltage into a direct current voltage. The capacitor 12 functions as a smoothing capacitor thereby smoothing the rectified direct current voltage.

The inverter 13 converts the direct current voltage smoothed by the capacitor 12 into a predetermined alternating current voltage according to respective phases, and the motor 5 is driven by the voltage supplied by the inverter 13.

In order to drive the BLDC motor, the position of the rotor must be matched to a phase of the supplied voltage. Thus, in general, a rotor position detecting circuit 15 to detect the position of the rotor is needed. The rotor position detecting circuit 15 includes a sensor to detect a position of the rotor, and recently in the art, the position sensor has included a Hall sensor (not shown).

A Hall sensor detects the position of the rotor by monitoring the rotation of the position detecting permanent magnet installed in an extended line of a rotation shaft of the motor.

Alternatively, without the position detecting permanent magnet, the rotor position detecting unit may be configured to detect the position of the rotor during the rotation of the permanent magnet of the rotor.

The microcomputer 16 compares the position of the rotor detected by the rotor position detecting circuit 15 with a predetermined rotation speed and outputs a signal to control the rotation speed of the motor according to a result of the comparison.

According to the control signal output from the microcomputer 16, the inverter driving unit 17 generates an inverted driving signal such that voltages of respective phases are supplied by the inverter 13 to the motor by the pulse width modulation (PWM) to control the rotation speed, torque, and the rotation direction of the motor.

The method of operating of the related art driving device of a drum type washing machine having the structure as described above will be described as follows.

First, when a single phase alternating current voltage (generally, 220 V, 60 Hz) 18 is input to drive the motor, the rectifier rectifies the input alternating current voltage and outputs the rectified alternating current voltage.

The capacitor 12 smoothes the voltage rectified by the rectifier 11 and converts the rectified voltage into a predetermined direct current voltage (generally 310 V). The inverter 13 converts the rectified direct current voltage into predetermined alternating current voltages and outputs the converted voltages to respective phases of the motor according to a signal of the inverter driver 17.

Due to the alternating voltages converted by the inverter 13, electric currents flow through stator coils wound around the respective phases of the stator u, v, and w, and a rotating magnetic field is formed due to the interaction between a magnetic field formed by the currents and the permanent magnet so that the rotor rotates and is synchronized with the rotating magnetic field.

The rotor position detecting circuit 15 detects the position of the rotor according to the predetermined alternating current voltages from the respective phases and outputs the detected result.

The microcomputer 16 compares the position of the rotor detected by the rotor position detecting circuit with a predetermined rotation speed of the rotor. A control signal is then output by the microcomputer to control the motor according to the result of the comparison.

The control signal output from the microcomputer 16 drives the switching components Q1 to Q6 of the inverter through the inverter driving unit 17. In other words, the switching components are turned on/off to control the magnitudes of the alternating current voltages applied to the motor by Pulse Width Modulation (PWM). By doing so, the magnitude of current applied to the motor is controlled, thus controlling the motor.

Hereinafter, the PWM for driving the motor will be described with reference to FIG. 3. FIG. 3 is a graph illustrating a principle of a sine pulse width modulation (sine PWM).

For the sine PWM, an oscillator is needed to oscillate a carrier wave such that the carrier wave serves as a reference to which the sine wave is compared. In general, a triangular wave is used as the carrier.

The sine PWM compares the triangular wave with the sine wave to a pulse wave corresponding to the comparison, wherein a frequency of the pulse wave is identical to a frequency of the triangular wave.

The sine wave is a predetermined output voltage of the inverter, namely, a reference voltage to be applied to the motor through the inverter for the control of the motor, in a current state. The carrier wave is a voltage to be compared with the reference voltage for the PWM, and generally has a frequency of a few kHz to several tens kHz and usually has a frequency of about 16 kHz for the driving of the drum type washing machine.

As illustrated in FIG. 3, when a PWM wave is generated by comparing the carrier with the reference voltage, the pulse widths of the respective phases vary according to the magnitude of the sine wave.

In other words, for example, when the reference voltage is higher than the carrier wave at phase u of the motor, a high switch component Q1 is switched on so that a high voltage is applied thereto, and conversely a low switch component Q2 is switched on so that a low voltage is applied thereto. As a result, the width of the pulse train is varied according to time when being compared with the reference voltage to be controlled. However, at that time, when an average value of the pulse width modulated waves is estimated, the average value becomes identical to the reference voltage.

The reference voltage does not always take a sine waveform. The magnitude and frequency of the reference voltage are varied such that a necessary electric power can be obtained according to a circumstance during the driving of the motor.

The PWM is a method of converting the reference voltage of an analog waveform into a pulse train with a predetermined frequency such that an average voltage applied to the motor is controlled and as a result, a current flow to the motor is controlled, for example, the direction and a magnitude of the current are controlled. Additionally, a torque is controlled by controlling the current.

The PWM for driving the motor is derived from a driving method of a power module, and according to the PWM, when the power module is controlled by a reference value (the reference voltage) of an analog waveform, the power module is operated within an active area so that a great deal of loss and heat occurs.

Thus, the PWM is used to control voltage and current in a saturation region and a cut-off area of the power module to minimize the power loss and consequently, heat produced by the motor.

However, even when the motor is driven by the PWM, the loss of power occurs due to the inverter, and a majority of the loss is caused by periodically switching the switches of the inverter.

The switching loss will be described in detail with reference to FIG. 4.

First, when the power module is switched on and the current flows therethrough, the current I is restricted by an internal resistance of the power module and an overall resistance of the motor. The voltage applied to the switch is only a voltage loss due to the internal resistance of the power module and an applied voltage is applied to an entire load.

When the power module is switched off, the entire applied voltage is applied to the switch and current does not flow. In other words, as the power module is toggled between on and off, any one of the voltage and current becomes almost 0 (zero). Thus, it has been assumed that there is no power loss.

However, as illustrated in FIG. 4, a significant power loss occurs during a transient period when the voltage and current applied to the power module is toggled between on and off. As a result, a power loss occurs and the power loss is mostly converted into heat inside the motor.

Although the power loss illustrated in FIG. 4, is shown to occur between when the power module is turn off and turned on, a power loss also occurs during the toggle period when the power module is switched from on to off.

The efficiency of the inverter is deteriorated due to the loss of power during the toggle periods and increased temperature of the inverter due to the power loss that is converted into heat. Thus, the operating range of driving the motor is restricted.

Moreover, since an inverter having a large capacity must be used and/or a heat radiator must be used in order to solve the above-mentioned problems, the size of the driving device of the drum type washing machine must be increased. Thus, the manufacturing costs of the washing machine are increased.

Therefore, there is a need for a driving device of a drum type washing machine that reduces the power loss during the toggle period of the inverter and reduces the cost of manufacturing the washing machine.

SUMMARY OF THE INVENTION

Accordingly, the present invention is directed to a driving device of a washing machine and a method of driving a washing machine with the same substantially obviates one or more problems due to limitations and disadvantages of the related art.

An advantage of the present invention is to provide a driving device and a method for controlling a washing machine in which capacity of an inverter is reduced while the efficiency of the inverter is improved so as to improve power loss of the inverter and reduce manufacturing costs.

Another advantage of the present invention is to provide a washing machine with a driving device and method of in which a motor of the washing machine is controlled using a carrier waving having a variable frequency.

Additional features and advantages of the invention will be set forth in the description which follows, and in part will be apparent to those having ordinary skill in the art from the description or may be learned by practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a driving device of a washing machine comprising: a variable motor configured to apply a driving force to a drum of the washing machine, wherein the variable motor includes variable rotational speeds; an inverter configured to convert a direct current voltage into an alternating current voltage and to vary a voltage applied to the variable motor; and an inverter driver configured to compare a control signal with a carrier wave, wherein the inverter driver drives the inverter by pulse width modulation, a frequency of the carrier wave being varied based on the pulse width modulation.

In another aspect of the present invention includes a washing machine comprising: a drum to accommodate laundry; a variable motor configured to apply a driving force to a drum to rotate, wherein the rotational speed of the variable motor varies; an inverter configured to convert a direct current voltage into an alternating current voltage and to vary a voltage applied to the variable motor; a microcomputer configured to generate a control signal to control the variable motor; and an inverter driver configured to compare the control signal with a carrier wave to drive the inverter by the pulse width modulation, a frequency of the carrier wave being varied for the pulse width modulation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
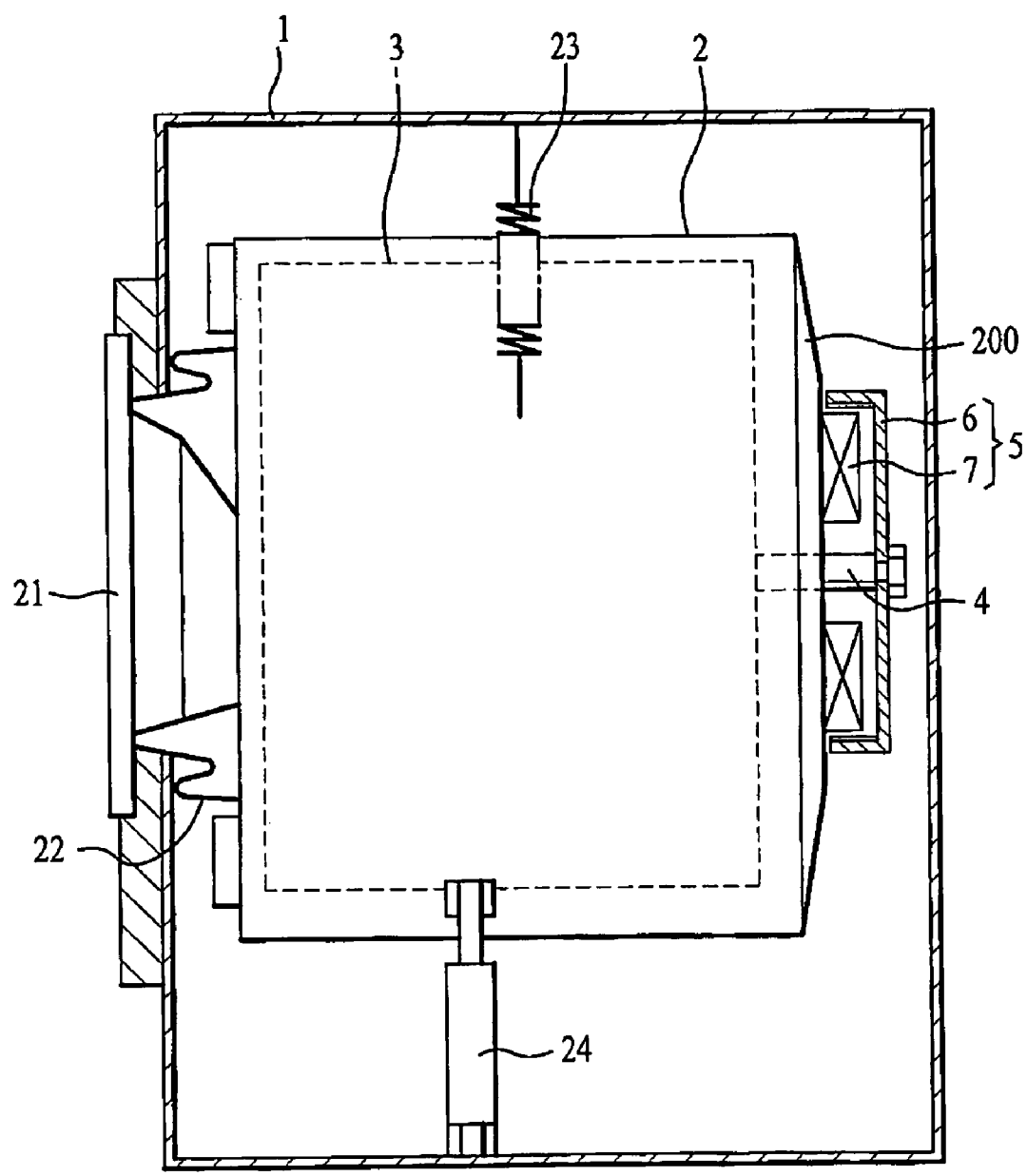
FIG. 1 is a sectional view illustrating a structure of a related art direct drive drum type washing machine.
Figure 2:
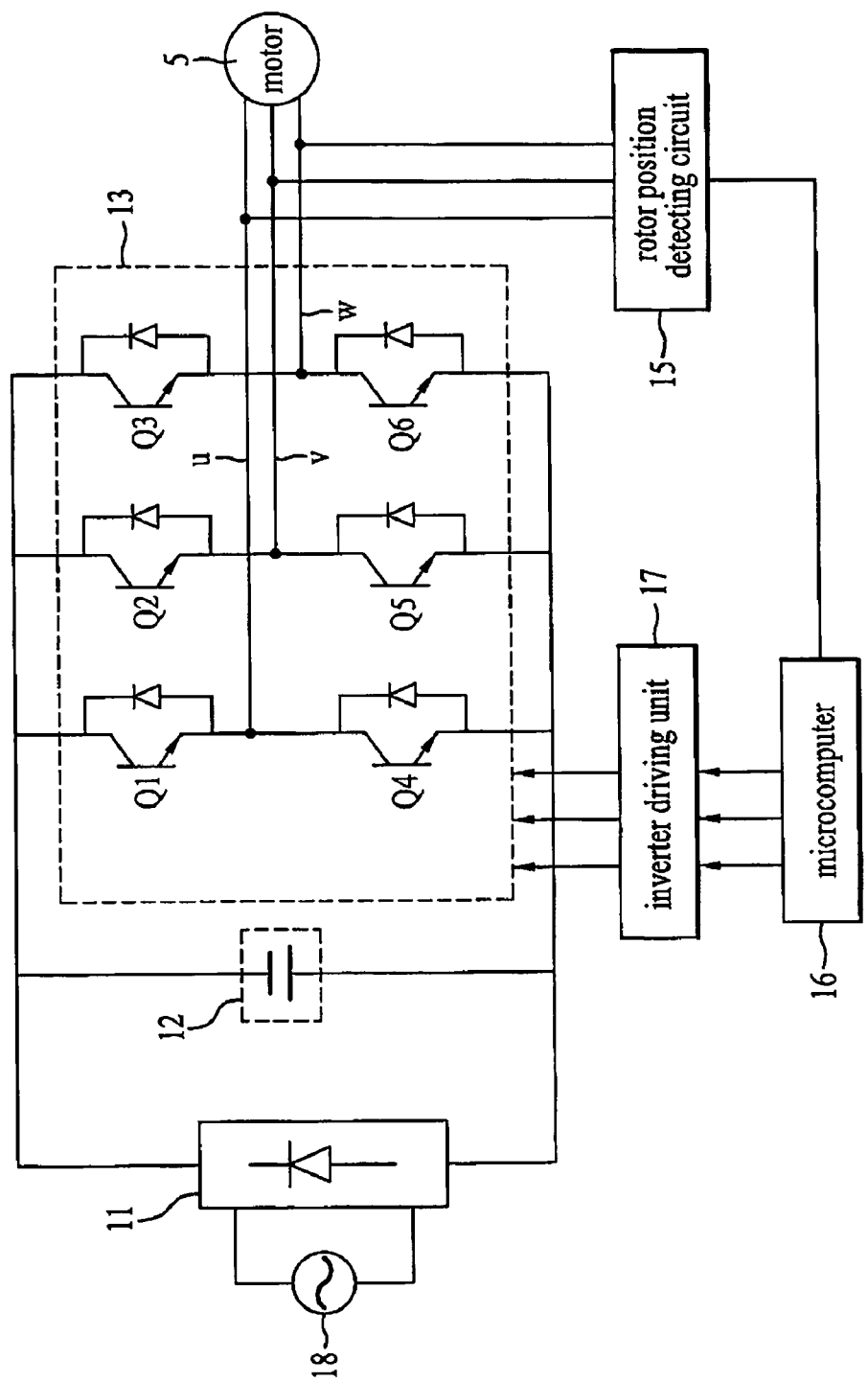
FIG. 2 is a circuit block diagram illustrating a driving device employing a related art BLDC motor of a conventional washing machine.
Figure 3:
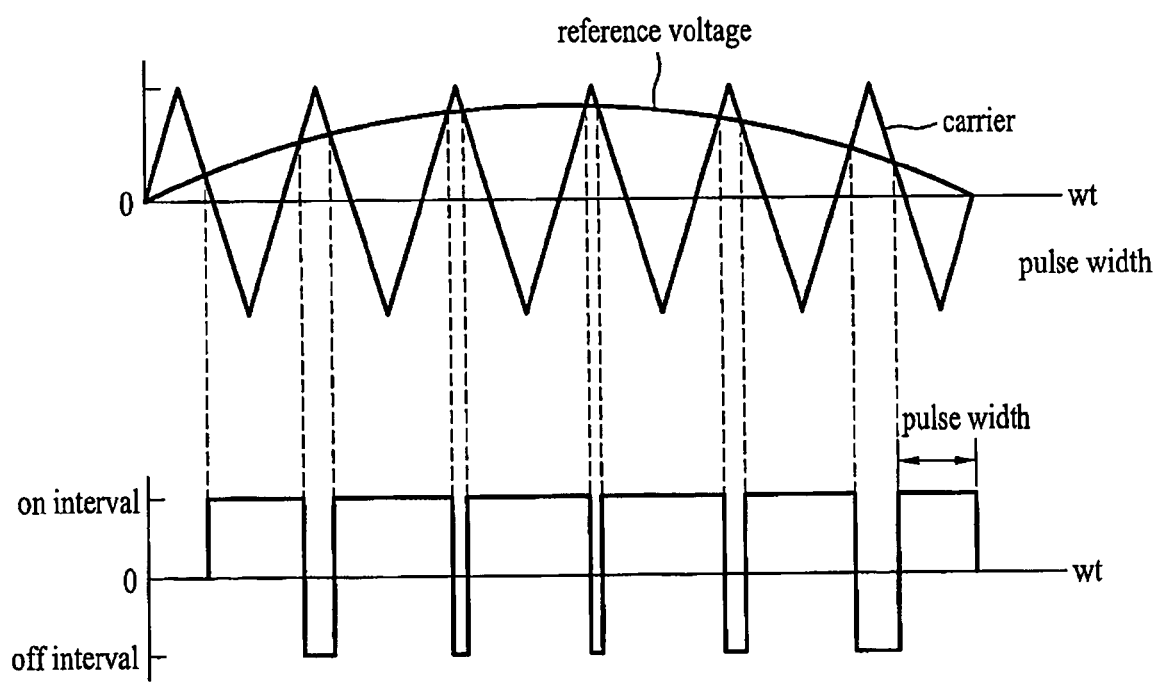
FIG. 3 is a graph illustrating a principle of a sine pulse width modulation.
Figure 4:
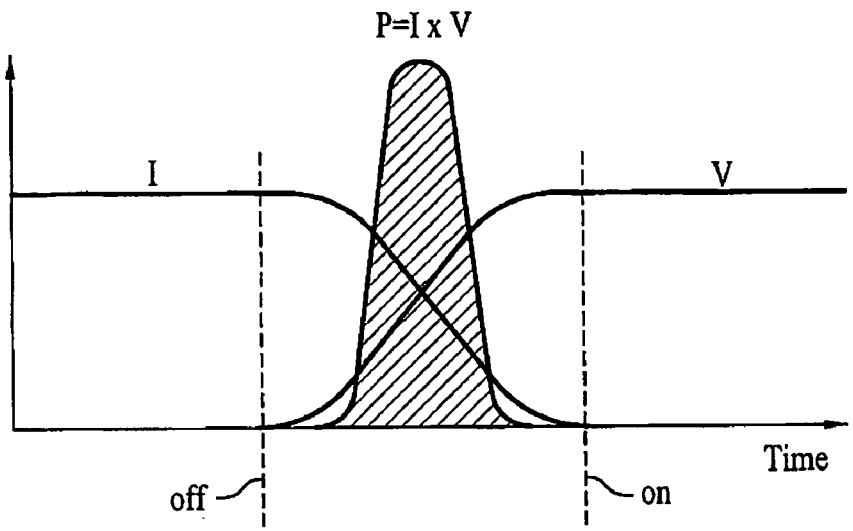
FIG. 4 is a graph illustrating a switching loss of a related art inverter.
Figure 5:
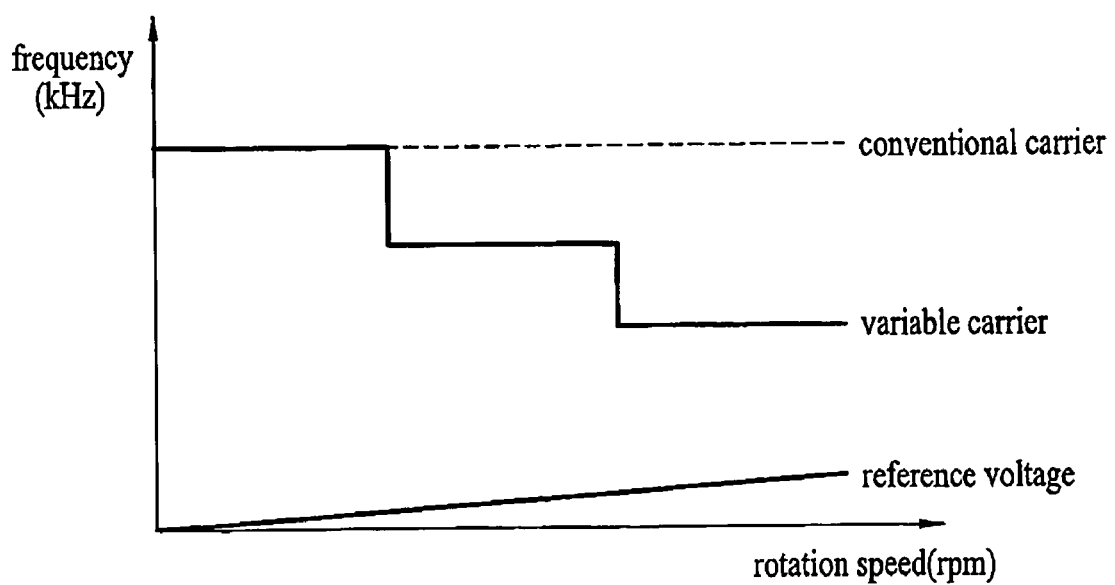
FIG. 5 is a graph illustrating a variable carrier according to an embodiment of the present invention.

Reference will now be made in detail to embodiments of a washing machine of the present invention, examples of which are illustrated in FIG. 5. In the description, the same reference numbers will be used to refer to the same or like parts as the conventional driving device of a washing machine and additional description for the same will be omitted.

FIG. 5 is a graph illustrating a variable carrier according to an embodiment of the present invention.

In contrast with a related art washing machine, the present invention includes a carrier wave generator that generates a carrier wave in which the frequency of the carrier wave is varied. In order to generate the PWM, the carrier wave with a varied frequency is compared to the control signal outputted from the microcomputer.

In a related art washing machine, a carrier wave with a predetermined frequency is generated, and the frequency required to toggle the switches within the inverted becomes identical to the frequency of the carrier wave. Thus, the frequency required to toggle the switches within the inverter becomes constant.

The motor of the related art washing machine can be more precisely controlled based on the control signal output from the microcomputer (in the related art, an analog reference voltage having a predetermined frequency and a predetermined magnitude). When the frequency of the carrier wave is high, the control signal can more precisely control the motor. However, in the related art, there is a limit to which the frequency of the carrier can be increased.

When the frequency of the carrier wave is high, a harmonic wave has a greater influence on the control signal thereby increasing signal noise within the driving device of the washing machine and increasing noise and vibration produced within the motor of the washing machine. When the harmonic wave has a greater influence on the control signal, it is more difficult to precisely control the motor.

Because of the problems mentioned above, in a related art washing machine, the frequency of the carrier wave is maintained at a predetermined value, for example, about 16 kHz. At this value, the capacity of the inverter must be increased. Since the frequency of the carrier wave remains constant, the power loss generated during the toggling of the switches within the inverter is always uniformly generated.

In the present invention, the predetermined frequency of the carrier is not maintained at a predetermined value, but varies as a certain factor varies. The power loss caused by toggling the switches within the inverter is reduced within the overall operating range of the washing machine, thus the capacity of the inverter is decreased.

The factor by which the frequency of the carrier wave is varied can be selected variously.

As illustrated in FIG. 5, in the present invention, the frequency of the carrier can be reduced according to the rotation speed of the motor. Namely, the related art frequency of the carrier is maintained at a low rotation speed and the frequency of the carrier can be gradually decreased as the rotation speed of the motor increases.

When the voltage applied to the motor increases, the rotational speed of the motor increases. As a result the current applied to the motor increases.

The decrease of the frequency of the carrier may be carried out step-wise or linearly. The ratio of the decrease may be optimized. FIG. 5 illustrates an example of the carrier wave decreased step-wise.

The influence on the control signal that may be caused by decreasing the frequency of the carrier wave will be described as follows.

The maximum frequency of the carrier wave is selected by taking the influence of the harmonic wave into consideration. When the frequency of the carrier wave is reduced, the voltage of the harmonic wave is increased and as a result, the current of the harmonic wave may increase to influence the control of the motor.

The reactance of the harmonic wave is proportional to the square of the rotation speed of the motor. Thus, as the rotation speed of the motor increases, the reactance of the harmonic wave has a very high value.

When the current of the harmonic wave has a very small value, the frequency of the carrier decreases as the rotational speed of the motor increases. In other words, the influence of the decrease of the carrier frequency may be estimated as very weak.

As described above, when the frequency of the carrier wave is decreased as the rotational speed of the motor increases, the power loss associated with the toggle of the switches within the inverter is reduced within the entire operating range of the motor so that the capacity of the inverter can be also reduced. Thus, any component for radiating heat away from the inverter may be eliminated or simplified, so that it is advantageous in view of manufacturing costs.

Since it is difficult to precisely control the motor as the frequency of the carrier is decreased in a case when the rotational speed of the motor is increased as described above, there is the possibility of noise being generated within the washing machine due to the increase of the operating time and an unstable state.

Thus, if the operating time and the noise generation are handled as principal factors of varying the frequency of the carrier wave, the frequency of the carrier wave may be increased as the rotational speed of the motor increases.

When the rotational speed of the motor is low, the frequency of the carrier wave should be reduced to be lower than the frequency of the carrier wave in the related art technique (for example, less than 16 kHz) to reduce the power loss generated during the toggling of the switches in the inverter throughout the entire operating range of the motor.

The load of the motor may be handled as a variable factor of the frequency of the carrier wave. Namely, it is possible to increase or decrease the frequency of the carrier wave as the load of the motor increases. Herein, the load of the motor means a torque of the motor. However, as similarly described above, the power loss generated during the toggling of the switches in the inverter should be small within the entire operating range of the motor.

When the load of the motor is considered as the variable factor of the frequency of the carrier wave, the frequency of the carrier wave can be reduced as the load of the motor increases in view of reactance as described above. In contrast, in view of the operating time and the noise, the frequency of the carrier wave can be increased as the load of the motor increases.

Since there is the possibility of the temperature increasing within the driving device as the load of the motor increases, it is also possible to reduce the frequency of the carrier wave as the load of the motor increases.

For example, when the motor is driven in the spin mode of the washing machine, the rotation speed of the motor gradually increases in the transient state, and consequently, the motor rotates at a predetermined rotation speed for a predetermined time period. In other words, rotation speed of the motor is controlled from the transient status to the steady-state status.

In order to attain more precise control of the washing machine motor and to prevent an excessive harmonic oscillation thereby allowing the motor to more rapidly reach the steady-state status, it is possible to increase the frequency of the carrier wave. In contrast, in the steady-state status, it is possible to reduce the frequency of the carrier wave so as to reduce the power loss generated during the toggling of switches within the inverter during the overall dehydrating time period.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A driving device of a clothes washing machine comprising:
    a variable speed motor configured to apply a rotational driving force to a drum;
    an inverter configured to convert a direct current voltage into an alternating current voltage and to vary a voltage applied to the variable speed motor;
    a carrier generator configured to generate a carrier signal; and
    an inverter driver configured to compare a control signal with the carrier signal to drive the inverter by pulse width modulation, a frequency of the carrier signal being varied to reduce a switching loss, of a switching device, generated by the inverter, wherein, in a dehydrating time period, the frequency of the carrier signal in a transient state when the rotation speed of the variable speed motor varies is lower than that in a normal state when the rotation speed of the variable speed motor is constant.

2. The driving device of a clothes washing machine according to claim 1, further comprising a microcomputer to generate the control signal to control the variable speed motor.

3. The driving device of a clothes washing machine according to claim 2, wherein the inverter driver generates an inverter driving signal by comparing the control signal output from the microcomputer with the carrier signal.

4. The driving device of a clothes washing machine according to claim 1, wherein the frequency of the carrier signal varies according to a rotation speed of the variable speed motor.

5. The driving device of a clothes washing machine according to claim 4, wherein the frequency of the carrier signal is decreased as the rotation speed of the variable speed motor is increased.

6. The driving device of a clothes washing machine according to claim 1, wherein the frequency of the carrier signal varies according to a load of the variable speed motor.

7. The driving device of a clothes washing machine according to claim 6, wherein the frequency of the carrier signal increases as the load of the variable speed motor increases.

8. A clothes washing machine comprising:
a drum to accommodate laundry;
a variable speed motor configured to apply a rotational driving force to the drum;
an inverter configured to convert a direct current voltage into an alternating current voltage and to vary a voltage applied to the variable speed motor;
a carrier generator configured to generate a carrier signal;
a microcomputer configured to generate a control signal to control the variable speed motor; and
an inverter driver configured to compare the control signal with the carrier signal to drive the inverter by pulse width modulation, a frequency of the carrier being varied to reduce a switching loss, of a switching device, generated by the inverter, wherein, in a dehydrating time period, the frequency of the carrier signal in a transient state when the rotation speed of the variable speed motor varies is lower than that in a normal state when the rotation speed of the variable speed motor is constant.

9. The clothes washing machine according to claim 8, wherein the microcomputer controls the clothes washing machine.

10. The clothes washing machine according to claim 8, wherein the frequency of the carrier signal varies according to a rotation speed of the variable speed motor.

11. The clothes washing machine according to claim 10, wherein the frequency of the carrier signal is decreased as the rotation speed of the variable speed motor is increased.

12. The clothes washing machine according to claim 8, wherein the frequency of the carrier signal varies according to a load of the variable speed motor.

13. The clothes washing machine according to claim 12, wherein the frequency of the carrier signal increases as the load of the variable speed motor increases.

* * * * *